United States Patent
Parla et al.

(10) Patent No.: US 12,407,677 B2
(45) Date of Patent: Sep. 2, 2025

(54) DYNAMIC USER AUTHENTICATION AND TRAFFIC STEERING

(71) Applicant: Cisco Technology, Inc., San Jose, CA (US)

(72) Inventors: Vincent E. Parla, North Hampton, NH (US); Valentiu Vlad Santau, Littleton, MA (US); Peter Davis, Wakefield, MA (US); Andrzej Konrad Kielbasinski, Grafton, MA (US)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 17/977,343

(22) Filed: Oct. 31, 2022

(65) Prior Publication Data
US 2024/0146718 A1 May 2, 2024

(51) Int. Cl.
*H04L 9/40* (2022.01)

(52) U.S. Cl.
CPC ........ *H04L 63/083* (2013.01); *H04L 63/0272* (2013.01)

(58) Field of Classification Search
CPC ............... H04L 63/083; H04L 63/0272; H04L 63/0807; H04L 63/0815
See application file for complete search history.

(56) References Cited

U.S. PATENT DOCUMENTS

| | | |
|---|---|---|
| 2013/0091537 A1 | 4/2013 | Parla et al. |
| 2019/0124059 A1 | 4/2019 | Perlmutter et al. |
| 2019/0349336 A1 | 11/2019 | Palojarvi et al. |
| 2020/0374121 A1* | 11/2020 | Momchilov .......... H04L 9/0825 |
| 2021/0250333 A1 | 8/2021 | Negrea et al. |
| 2021/0336959 A1 | 10/2021 | Shah et al. |

\* cited by examiner

*Primary Examiner* — Izunna Okeke
(74) *Attorney, Agent, or Firm* — Lee & Hayes, P.C.

(57) ABSTRACT

Techniques for dynamically establishing, pausing, and/or terminating secure communication sessions. The techniques may include, detecting an occurrence of an authentication trigger event on a computing device and causing a user of the computing device to be authenticated for access to a resource that is to be accessed via a secure communication session. Based at least in part on authenticating the user for access to the resource, a token may be stored in a location that is accessible to a headend appliance associated with the secure communication session. The token may indicate that the user of the computing device is authenticated for access to the resource. In this way, at least partially responsive to detecting an occurrence of a networking trigger event, the secure communication session may be established between the computing device and the headend appliance to provide the computing device with access to the resource.

19 Claims, 7 Drawing Sheets

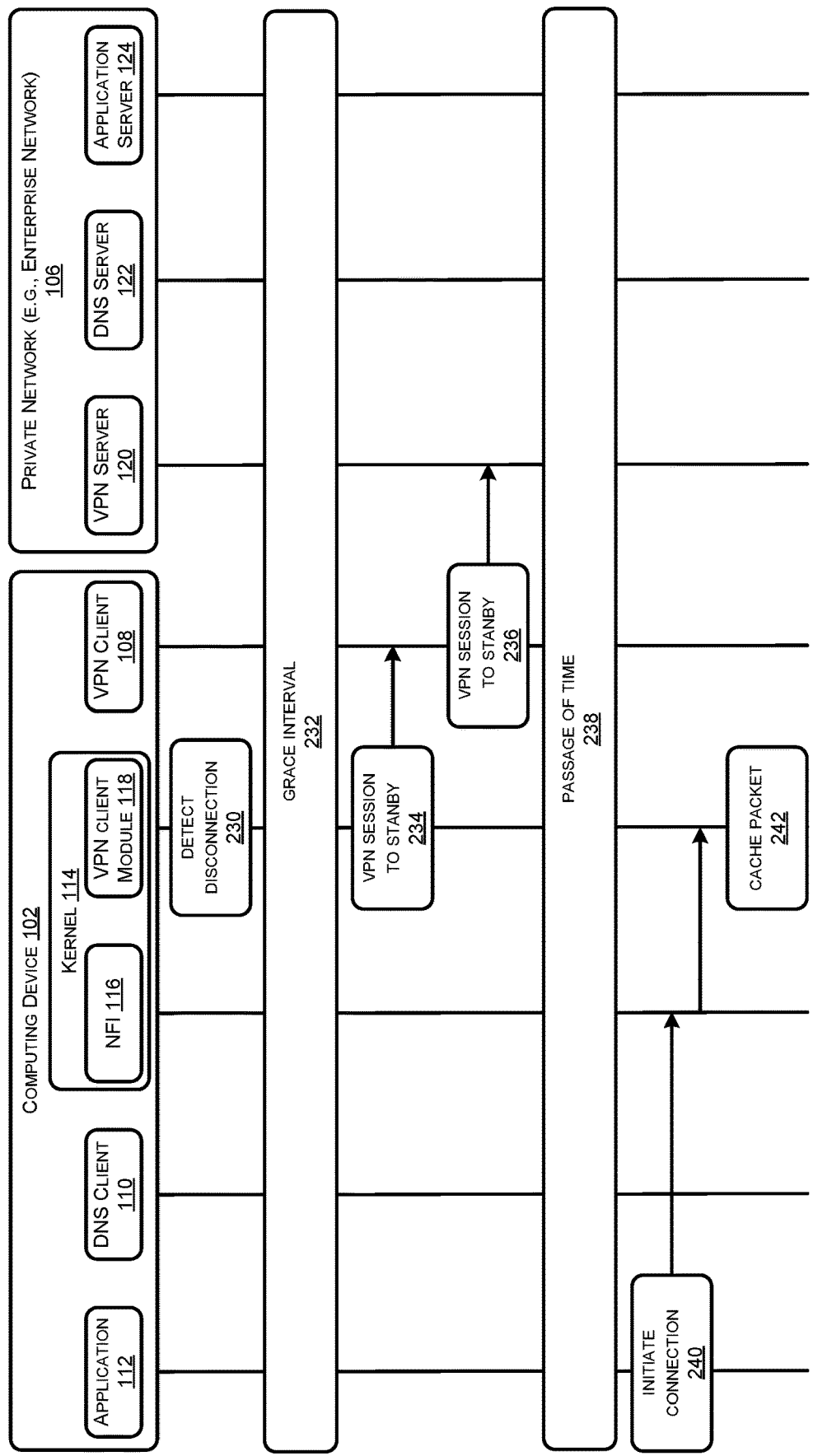

DYNAMIC USER AUTHENTICATION AND TRAFFIC STEERING

TECHNICAL FIELD

The present disclosure relates generally to techniques for, among other things, dynamic establishment, pause, and/or termination of secure communication sessions.

BACKGROUND

Techniques for automatically starting a secure communication session (e.g., virtual private network tunnel, zero-trust network access tunnel, proxy session, etc.) based on a pre-defined set of rules have existed for quite some time in some form or another. More recently, improvements have been made in features like on-demand virtual private network solutions that have made for a better overall "automatic session initiation" ecosystem. However, the dynamicity of secure sessions is still greatly lacking. While existing solutions are good at initiating a tunnel/session based on rudimentary, pre-defined policies, there are some major shortcomings.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A-2D are control flow diagrams collectively illustrating an example implementation of the techniques described herein.

DESCRIPTION OF EXAMPLE EMBODIMENTS

Overview

Figure 1:
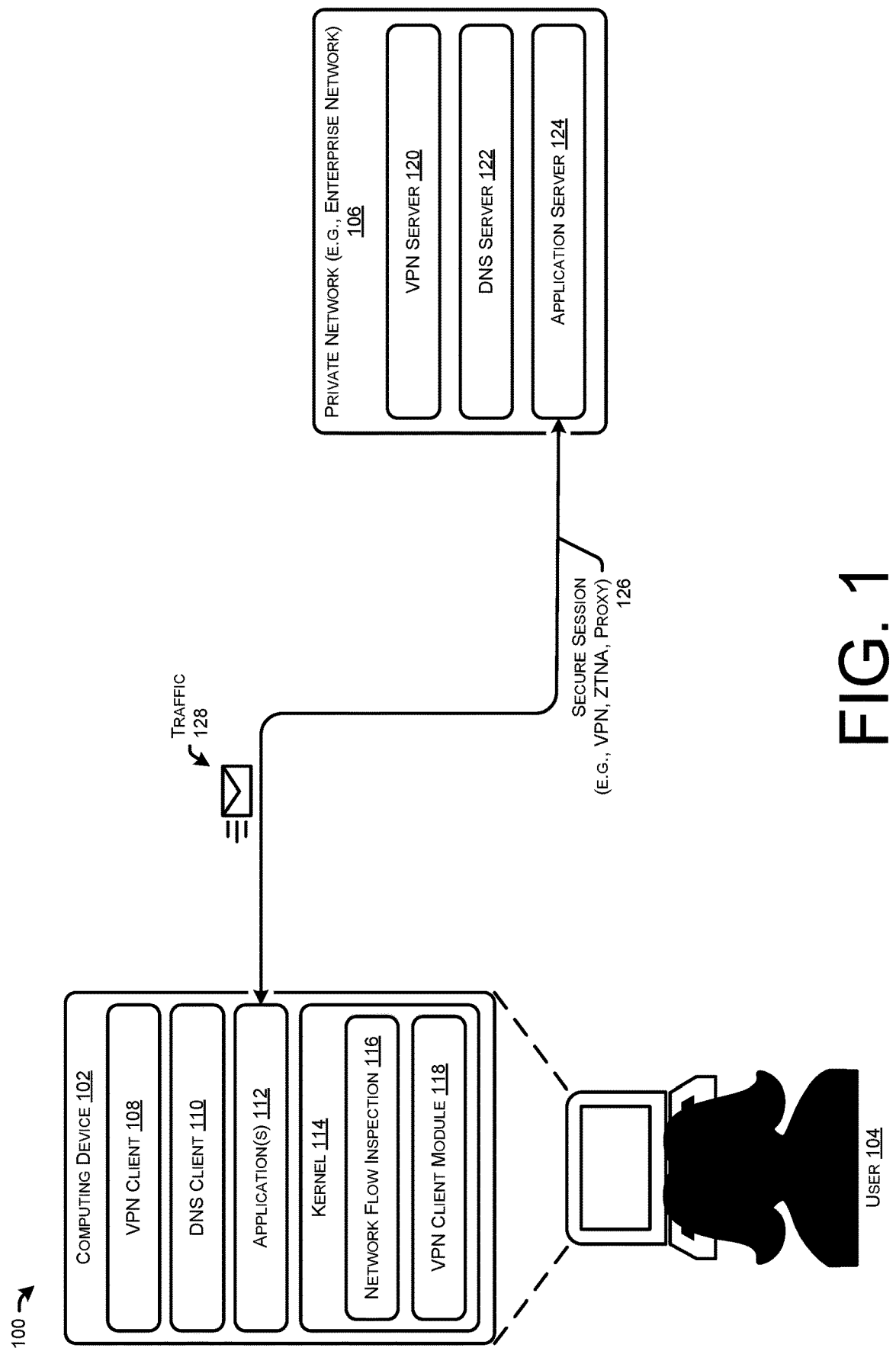
FIG. 1 illustrates an example architecture that may implement various aspects of the technologies described herein.
Figure 2A:
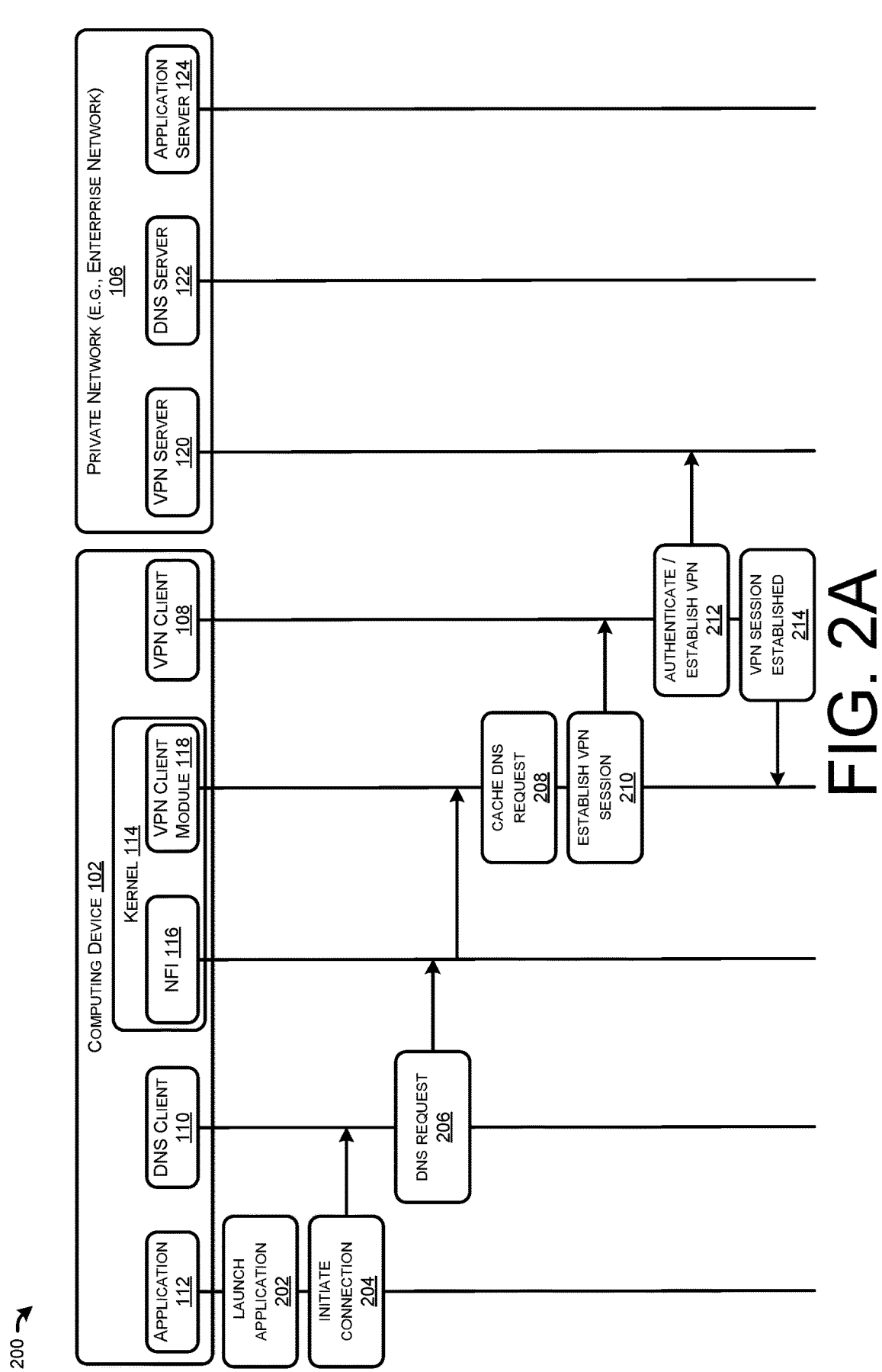
Figure 2B:
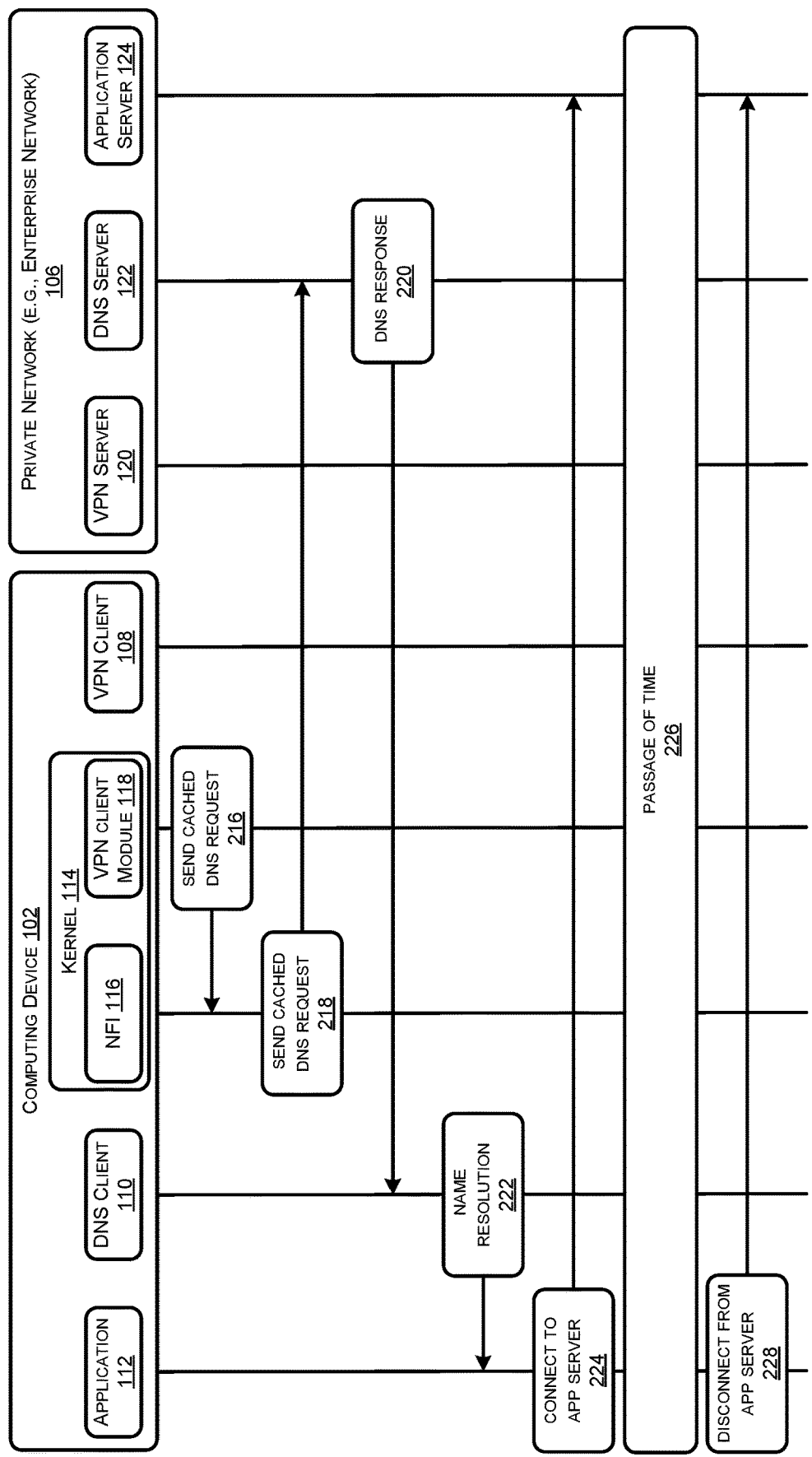
Figure 2D:
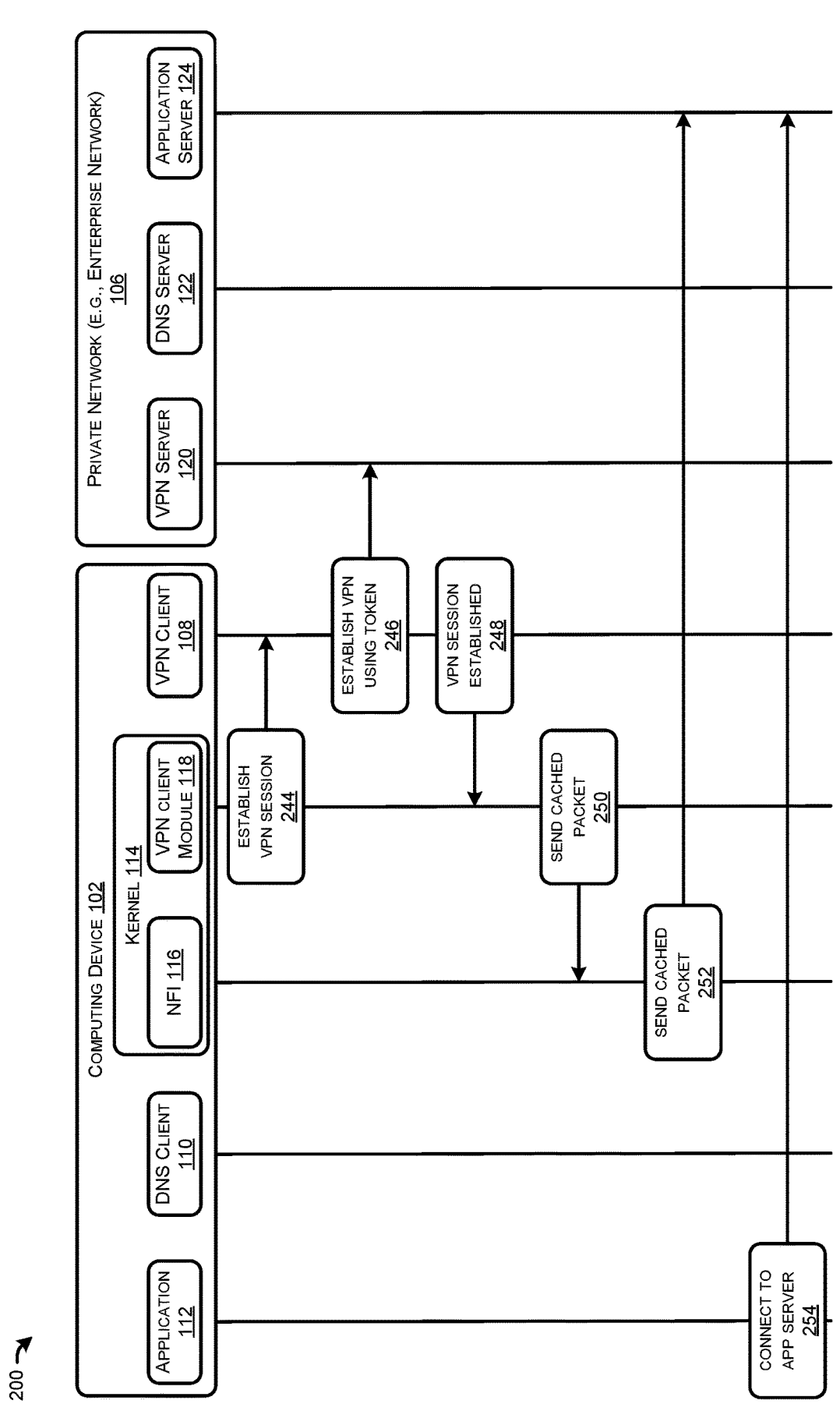

This disclosure describes various technologies for dynamic establishment, pause, and/or termination of secure communication sessions. By way of example, and not limitation, the techniques described herein may include detecting an occurrence of an authentication trigger event on a computing device and causing a user of the computing device to be authenticated for access to a resource that is to be accessed via a secure communication session. Based at least in part on authenticating the user for access to the resource, a token may be stored in a location that is accessible to a headend appliance associated with the secure communication session. The token may indicate that the user of the computing device is authenticated for access to the resource. In this way, at least partially responsive to detecting an occurrence of a networking trigger event, the secure communication session may be established between the computing device and the headend appliance to provide the computing device with access to the resource.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, the dynamicity of secure sessions is still greatly lacking, even though recent improvements have been made in features like on-demand virtual private network (VPN) solutions. While existing solutions are good at initiating a tunnel/session based on rudimentary, pre-defined policies, there are some major shortcomings. In particular, detecting both the initiation and termination of Enterprise-directed flows, and then correlating those triggers in order to make connect, pause, or termination actions for sessions dynamically is lacking today.

By way of example, today's solutions do not provide the ability to pause and/or terminate a secure session based on a combination of location detection (e.g., on or off enterprise network) coupled with enterprise-directed flow detection. In other words, there is no existing ecosystem that can look at a combination of device location (e.g., whether the device is at a location such that a secure session needs to be in place) and/or Enterprise-directed flow activity (e.g., whether there are any recent or active enterprise-directed flows) and determine that a secure session can be terminated and/or paused. Additionally, today's solutions do not provide any secure session memory capability where secure session initiation triggers can be learned from prior secure session configuration(s) or prior secure session flow observation(s). That is, there is no way to remember a prior configuration and/or learn what flows previously traversed a secure session and save this information as a future trigger for dynamically initiating a secure session. Additionally, today's solutions provide for only very limited authentication methods. In many cases, these solutions support only non-interactive authentication methods, such as certificate-based authentication. Furthermore, with these existing solutions, there exists a tight coupling between secure session authentication workflows and secure session establishment workflows.

This application is directed to technologies for dynamic establishment, pause, and/or termination of secure communication sessions by combining trusted network detection with internet protocol (IP) and/or domain name system (DNS) flow detection, while decoupling secure session authentication from secure session establishment workflows. The technologies disclosed herein solve the shortcomings of existing solutions, including those discussed above with respect to being able to dynamically establish, pause, and/or terminate secure communication sessions based on a combination of device location and detection of enterprise-directed flows (e.g., DNS or IP flows destined for private resources (e.g., enterprise resources)), session-memory capabilities where session initiation triggers can be learned from prior-session configuration or prior-session flow observation, multiple authentication methods (e.g., SAML, RADIUS, WebAuthN, Certificates, etc.), loose coupling between secure session authentication ceremony and secure session (e.g., session) establishment, and the like. For example, the technologies disclosed herein allow for a secure session (e.g., VPN, ZTN, proxy, etc.) authentication to occur as part of device authentication (e.g., a user opens their laptop and logs on), while not consuming headend resources when they are not needed.

As used herein, a "secure communication session" may include a VPN session, a ZTNA session, a proxy session (including forward proxy, reverse proxy, etc.), a TLS session, or any other type of tunneled or encrypted communication session. That is, while many of the examples described herein are with reference to VPN session embodiments, the techniques described herein may be similarly applied to ZTNA sessions, proxy session, TLS session, or any other type of tunneled or encrypted communication session technologies.

In some examples, the techniques described herein allow for dynamic initiation or reestablishment of a secure communication session (e.g., VPN session, ZTNA session, proxy session, or any other encrypted session) upon detection of network flows targeting private (e.g., enterprise) resources. These techniques may, in some instances, apply both pre- and post-authentication, namely for the initial secure session establishment, and during the secure session, respectively (e.g., to keep the session active when relevant flows are in progress). For example, once a Trusted Network Detection (TND) component passively (or actively) detects an untrusted network, the TND-based secure session may be delayed for connecting until, for instance, a DNS request for a domain name (DNS) or an IP packet flow towards a target resource is encountered. In some examples, a predefined list of target domains and IP address (or subnets/ranges) may be specified for the system to watch for. Additionally, or alternatively, domain names and/or IP addresses may be retrieved from memory for previous secure session session configurations (e.g., default domain, split-DNS include domains, dynamic split include domains, split include networks+client address subnet+IP addresses dynamically resolved from mentioned domains). Additionally, or alternatively, dynamic flow observation may be used to remember previously tunneled flows.

In examples, a secure session may remain connected while there are pending network flows to private resources derived from the current secure session session's configuration, plus a grace interval. Otherwise, the secure session may transition to a standby/paused state, which allows seamless transitioning back to a connected state. In some examples, a time-window algorithm may be used to further refine the trigger for dynamic disconnection (e.g., if no active sessions/attempts within an N-minute window, disconnect (where N may be any number)).

In some examples, the techniques described herein implement a logical separation of user/device authentication from session (e.g., secure session) establishment, specifically when such a policy is implemented in a network. With such configuration, the secured session may be in the connected state while network flows pertaining to private resources are in progress, otherwise the session may switch to the standby/paused state. As an example workflow, the techniques described herein may work in the following way: (i) a user may open/power-on their laptop; (ii) the user may be challenged for a biometric authentication (e.g., WebAuthN), and/or certificates may be used, as can any other authentication method (e.g., SAML, RADIUS, etc.); (iii) once authenticated, the secure session may be initially established and/or then placed into a standby state such that no resources are consumed on the headend security appliance except for storage of a secure token for the secure session; (iv) when a domain (DNS) or an network session (IP) attempt is observed that matches the policy, the secure session is moved from the standby state to a connected state and the secure session is resumed with the headend appliance, and the pended DNS or IP session(s) are allowed to continue; (v) when traffic associated with the secured session(s) has ceased for a window of time (grace period) provisioned by the policy, the secure session is once again placed in the standby state and/or disconnected. In examples, when certificate authentication is used in place of biometric authentication, the sessioning may be fully transparent with no user interaction. In further examples, the technologies may be used to monitor for process-specific network sessions (e.g. sessions from Chrome.exe), which can include policies that trigger on hash of a process, and/or the location the process image on disk, is invoked from, including wildcard rules (e.g., any process located in a subtree of C:/Program Files/Microsoft/* will result in sessioning of that processes' network traffic). As an example, composite policies may be created that additionally include port rules and destination rules in addition to the process context previously described.

By way of example, and not limitation, a method according to the techniques disclosed herein may include detecting an occurrence of an authentication trigger event on a computing device, the authentication trigger event associated with authenticating a user of the computing device for access to a private resource (e.g., enterprise resource). In some examples, the authentication trigger event may be associated with the computing device being powered-on and/or logged into by a user. Additionally, or alternatively, the authentication trigger event may be associated with the computing device joining a specific network, such as their home network, a Wi-Fi network, a cellular network, etc. (e.g., any other network than the network associated with a private resource the user may access). Additionally, or alternatively, the authentication trigger event may be associated with an attempt, by the computing device, to access the private resource (e.g., enterprise resource, a banking application, or another private resource). In examples, the authentication trigger event may be any event defined in a policy that, when detected, triggers the user/computing device being authenticated for access to the private resource.

In some examples, at least partially responsive to detecting the occurrence of the authentication trigger event on the computing device, the user of the computing device may be authenticated for access to a private resource. In some examples, the user/computing device may be required to access the private resource via a secure communication session. In some examples, to authenticate the user, the user may be challenged for a biometric authentication (e.g., WebAuthN). Additionally, or alternatively, certificates may be used, as can any other authentication method (e.g., SAML, RADIUS, etc.) to authenticate the user for access to the private resource.

In some examples, a token (e.g., cryptographic token) may be stored in a location that is accessible to a headend appliance (e.g., a security appliance such as a VPN terminator, or the like) associated with the secure communication session. For instance, the token may be stored in the location based at least in part on authenticating the user for access to the resource. In some examples, the token may indicate that the user of the computing device is authenticated for access to the resource. In other words, the token may indicate that the user and/or the computing device does not need to be re-authenticated again (e.g., at a later time) to access the resource.

In some examples, the method may include detecting an occurrence of a networking trigger event. The networking trigger event may be any event defined in a policy that, when detected, triggers the establishment of the secure communication session. As an example, the networking trigger event may be associated with a domain name system (DNS)

query for the private resource (e.g., detecting a DNS request packet). As another example, the networking trigger event may be associated with the computing device attempting to establish an internet protocol (IP) session with the private resource (e.g., detecting an IP address-based connection attempt).

In some examples, the method may include establishing the secure communication session between the computing device and the headend appliance to provide access to the private resource. In some instances, the secure communication session may be established based at least in part on the token stored in the location accessible to the headend appliance. Additionally, in some examples, the secure communication session may be established at least partially responsive to detecting the occurrence of the networking trigger event.

In some examples, the secure communication session may be transitioned back and forth from a connected state to a standby state, depending on the activity of traffic across the session. For instance, subsequent to establishing the secure communication session between the computing device and the headend appliance, a determination may be made that a lapse in a flow of traffic over the secure communication session has occurred (e.g., no packets directed to the private resource(s) for a threshold period of time, which may be equal to N minutes, N hours, etc., where N may be equal to any number). In such examples, based at least in part on determining the lapse in the flow of traffic, the secure communication session may be transitioned from an active or connected state to a standby state, or even a disconnected state, such that the headend appliance is less constrained for a computing resource. That is, the session may revert to the state it was in prior to detecting the networking trigger event, where the token is stored by the headend appliance but the session is not established for traffic to flow. Similarly, while the secure communication session is in the standby state, a networking trigger event may be detected and the secure communication session may be transitioned back to the active or connected state so that the computing device can access the resource.

According to the technologies disclosed herein, several advantages in computer-related technology may be realized to improve the functioning of computers. For example, use of the technologies result in significant resource savings for headend appliances (e.g., VPN session headends, ZTNA session headends, proxies, etc.). In a cloud-native (e.g., ZTNA or VPN as a service) scenario, where potentially millions of sessions are involved, storing a small cryptographic token is far less expensive than a typical VPN session entry. For example, a VPN session entry on a headend security appliance could be a few kilobytes of storage versus a relatively small cryptographic session token.

Another improved component associated with the disclosed techniques is an improved user experience. By decoupling authentication from sessioning activity, the solution expands the possibilities of what triggers can be used. For example, opening a laptop or entering a passcode on a mobile device could trigger the authentication element only, such that a user does not even perceive a secured session being initiated at all. This allows for an invisible sessioning experience that is not limited to certificate-based authentications. For example, a Windows Logon could also be a VPN Logon in this model using a pre-login access provider (PLAP) or credential provider component. One could, for example, open their laptop, visit some personal social media sites, personal email, etc., and then later on need to access to an enterprise resource. In such a case, the user would not notice a difference in the access of personal versus enterprise resources because the act of opening/powering-on the laptop would drive the workflow for authenticating the secure session. That is, the enterprise resource may be seamlessly tunneled without the explicit user action of initiating a ZTNA or VPN. As such, when the user browsed external or internal resources, their experience would be identical to how it would have been on the enterprise network. These and other advantages will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. For example, the figures below show several examples with respect to VPN session embodiments, but the techniques of this disclosure are applicable to many other cases and not just VPN sessions, such as ZTNA sessions, Proxy sessions, and/or any other secure communication session techniques. That is, the disclosure encompasses variations of the embodiments, as described herein. Like numbers refer to like elements throughout.

FIG. 1 illustrates an example architecture 100 that may implement various aspects of the technologies described herein. The architecture 100 includes a computing device 102 associated with a user 104, the user 104 using the computing device 102 to access resources on a private network 106, which, for example, may be an enterprise network.

The computing device 102 may include a VPN client 108 (which may also be a ZTNA client, proxy client, etc.), a DNS client 110, one or more application(s) 112, and a kernel 114, which may host a network flow inspection component 116 and a VPN (ZTNA, proxy, etc.) client module 118 component. The private network 106 may include a VPN server 120 (which may also be a ZTNA server, proxy, relay, etc.), a DNS server 122, and an application server 124. In examples, a secure session 126 (e.g., VPN session) may be established between the computing device 102 and the private network 106 such that traffic 128 may flow between the two (e.g., between the application(s) 112 and the application server 124).

In some examples, the kernel 114 may detect an occurrence of an authentication trigger event on the computing device 102. In some examples, the authentication trigger event may be associated with the computing device 102 being powered on and/or logged into by the user 104. Additionally, or alternatively, the authentication trigger event may be associated with the computing device 102 joining a specific network, such as their home network, a Wi-Fi network, a cellular network, etc. (e.g., any other network than the network associated with a private resource the user 104 may access). Additionally, or alternatively, the authentication trigger event may be associated with an attempt, by the computing device 102, to access the private resource (e.g., enterprise resource, a banking application, or another private resource) or otherwise connect to the private network 106. In examples, the authentication trigger event may be any event defined in a policy that, when detected, triggers the user 104/computing device 102 being authenticated for access to the private network 106 or a resource of the private network 106.

In some examples, at least partially responsive to the kernel 114 detecting the occurrence of the authentication trigger event on the computing device 102, the user 104 of the computing device 102 may be authenticated for access to the private resource. In some examples, the user 104/computing device 102 may be required to access the private resource via the secure session 126. In some examples, to authenticate the user 104, the user 104 may be challenged for a biometric authentication (e.g., WebAuthN). Additionally, or alternatively, certificates may be used, as can any other authentication method (e.g., SAML, RADIUS, etc.) to authenticate the user 104 for access to the private resource.

In some examples, a token (e.g., cryptographic token) may be stored in a location that is accessible to the VPN server 120 of the private network 106. For instance, the token may be stored in the location based at least in part on authenticating the user 104 for access to the resource. In some examples, the token may indicate that the user 104 of the computing device 102 is authenticated for access to the resource. In other words, the token may indicate that the user 104 and/or the computing device 102 does not need to be re-authenticated again (e.g., at a later time) to access the resource.

In some examples, the kernel 114 may detect an occurrence of a networking trigger event. The networking trigger event may be any event defined in a policy that, when detected, triggers the establishment of the secure session 126. As an example, the networking trigger event may be associated with a domain name system (DNS) query for the private resource (e.g., detecting a DNS request packet). As another example, the networking trigger event may be associated with the computing device 102 attempting to establish an internet protocol (IP) session with the private resource (e.g., detecting an IP address-based connection attempt).

In some examples, the VPN client 108 and the VPN server 120 may establish the secure session 126 between the computing device 102 and the private network 106 to provide access to the application server 124. In some instances, the secure session 126 may be established based at least in part on the token stored in the location accessible to the VPN server 120. Additionally, in some examples, the secure session 126 may be established at least partially responsive to detecting the occurrence of the networking trigger event.

In some examples, the secure session 126 may be transitioned back and forth from a connected state to a standby state, depending on the activity of traffic 128 across the session. For instance, subsequent to establishing the secure session 126 between the computing device 102 and the private network 106, a determination may be made that a lapse in a flow of traffic 128 over the secure session 126 has occurred (e.g., no packets directed to the private resource(s) for a threshold period of time, which may be equal to N minutes, N hours, etc., where N may be equal to any number). In such examples, based at least in part on determining the lapse in the flow of traffic 128, the secure session 126 may be transitioned from an active or connected state to a standby state, or even a disconnected state, such that the VPN server 120 is less constrained for a computing resource. That is, the secure session 126 may revert to the state it was in prior to detecting the networking trigger event, where the token is stored by the VPN server 120 but the session is not established for traffic to flow. Similarly, while the secure session 126 is in the standby state, a networking trigger event may be detected and the secure session 126 may be transitioned back to the active or connected state so that the computing device 102 can access the resource.

FIGS. 2A-2D are control flow diagrams collectively illustrating an example implementation 200 of the techniques described herein. At operation 202, the application 112 is launched on the computing device 102, and at operation 204, the application 112 initiates a connection to the application server 124 via the VPN server 120. For instance, the connection may be requested by domain name, as opposed to an IP address, in some examples. In turn, this triggers a DNS request at operation 206. In examples, the network flow inspection component 116 may intercept the DNS request and forward it to the VPN client module 118 of the kernel 114.

The VPN client module 118 may, at operation 208, determine that a query name matches a private resource and cache the DNS request. Then, at operation 210, the VPN client module 118 may notify the VPN client 108 to establish a VPN session to the private network 106. The VPN client 108 may, at operation 212, authenticate the user and establish the VPN session. Then, at operation 214, the VPN client 108 may notify the VPN client module 118 that the VPN session is established.

At operation 216, the VPN module 118 may send the cached DNS request. For instance, the VPN module 118 may cause the cached DNS request to be injected into a TCP/IP stack to be routed over the VPN session. At operation 218, the network flow inspection 116 component may send the cached DNS request to the DNS server 122 via the VPN session. At operation 220, the DNS server 122 may send a DNS response to the DNS request. At operation 222, after receiving the DNS response, the DNS client 110 may provide a name resolution to the application 112. Then, at operation 224, the application 112 may connect to the application server 124 via the VPN session.

At operation 226, a period of time passes in which flows are directed over the VPN session, in some instances. At operation 228, the application 112 initiates a disconnection from the application server 124. At operation 230, the VPN client module 118 detects the disconnection of the application 112 from the application server 124. At operation 232, a grace interval takes place and, at operation 234, after no network flows over the VPN are detected for a period matching the grace interval, the VPN client module 118 may notify the VPN client 108 to cause the VPN session to enter a standby state. At operation 236, the VPN client 108 may cause the VPN session to enter the standby state.

At operation 238, a passage of time occurs, which could be any length of time (e.g., seconds, minutes, hours, etc.). At operation 240, the application 112 initiates an IP address-based TCP connection with the application server 124. This is intercepted by the network flow inspection component 116 and the VPN client module 118 is notified. At operation 242, the VPN client module 118 causes the TCP packet to be cached. At operation 244, the VPN client module 118 notifies the VPN client 108 to establish the VPN session. At operation 246, the VPN client 108 reestablishes the VPN session with the VPN server 120 using a stored token.

At operation 248, the VPN client 108 notifies the VPN client module 118 that the VPN session has been reestablished. At operation 250, the VPN client module 118 causes the cached packet to be sent, and at operation 252, the network flow inspection 116 component send the cached packet to the application server 124, which causes the application 112 to be re-connected to the application server 124 at operation 254

Figure 3:
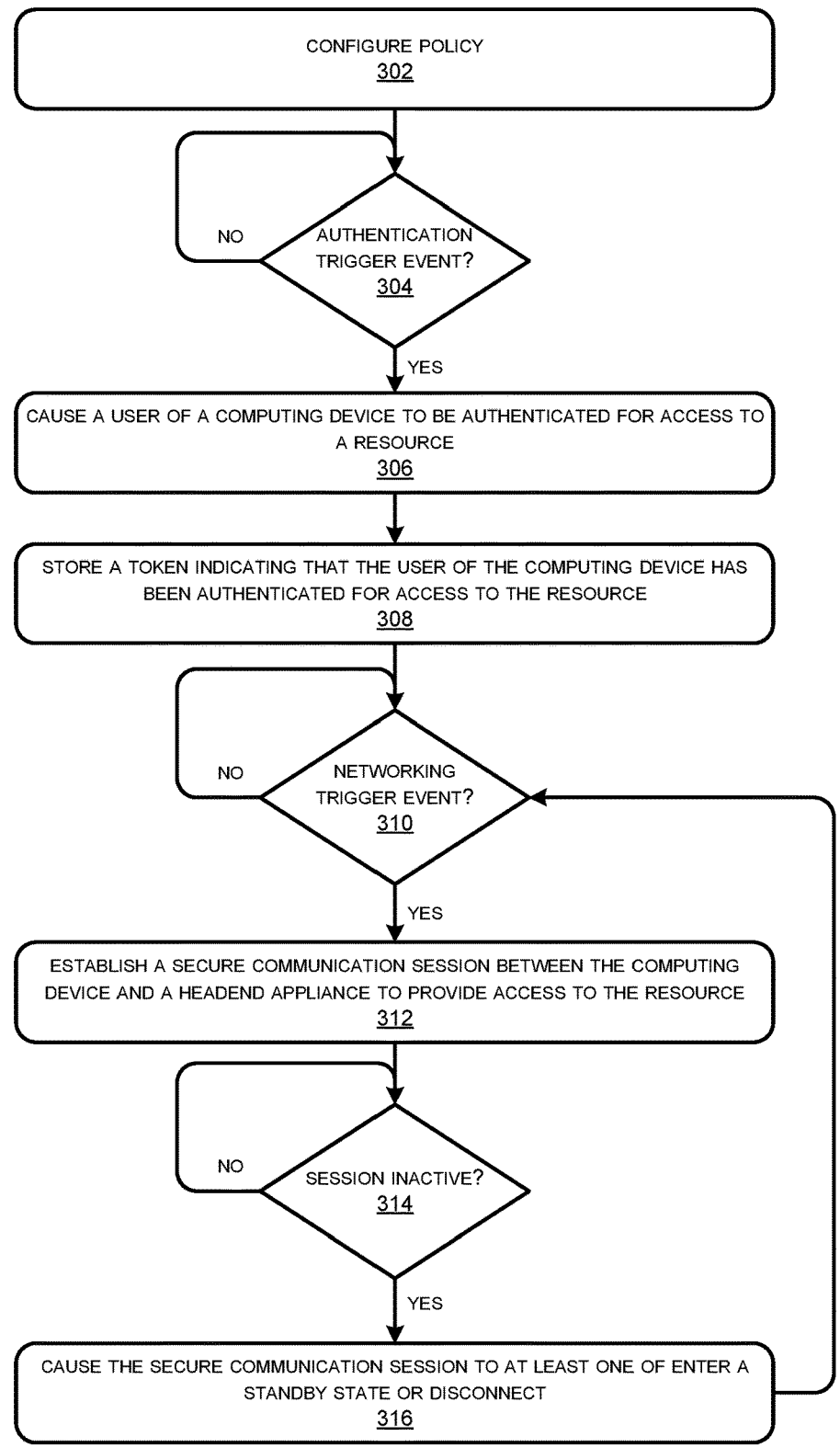
FIG. 3 is a flow diagram illustrating an example method associated with the techniques described herein.

FIG. 3 is a flow diagram illustrating an example method 300 associated with the techniques described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes configuring a policy. In some examples, the policy may indicate which network flows are to be sent via a secure session, and under what circumstances. For instance, a policy may specify that a user is to send flows via a secured session anytime the user's device is not on the enterprise network.

At operation 304, the method 300 includes determining whether an authentication trigger event has occurred on a computing device of a user. For instance, the kernel 114 may determine whether the authentication trigger event has occurred. In some examples, the authentication trigger event may be associated with the computing device 102 being powered on and/or logged into by the user 104. Additionally, or alternatively, the authentication trigger event may be associated with the computing device 102 joining a specific network, such as their home network, a Wi-Fi network, a cellular network, etc. (e.g., any other network than the network associated with a private resource the user 104 may access). Additionally, or alternatively, the authentication trigger event may be associated with an attempt, by the computing device 102, to access the private resource (e.g., enterprise resource, a banking application, or another private resource) or otherwise connect to the private network 106. In examples, the authentication trigger event may be any event defined in a policy that, when detected, triggers the user 104/computing device 102 being authenticated for access to the private network 106 or a resource of the private network 106.

If, at operation 304, the authentication trigger event is detected, the method 300 proceeds to operation 306. However, is the authentication trigger event is not detected, the method 300 proceeds back to operation 304 to continue monitoring for an authentication trigger event.

At operation 306, the method 300 includes causing a user of the computing device to be authenticated for access to a resource (e.g., a private, enterprise resource). For instance, the user 104 of the computing device 102 may be authenticated for access to the private resource. In some examples, the user 104/computing device 102 may be required to access the private resource via the secure session 126. In some examples, to authenticate the user 104, the user 104 may be challenged for a biometric authentication (e.g., WebAuthN). Additionally, or alternatively, certificates may be used, as can any other authentication method (e.g., SAML, RADIUS, etc.) to authenticate the user 104 for access to the private resource.

At operation 308, the method 300 includes storing a token indicating that the user of the computing device has been authenticated for access to the resource. In some examples, the token (e.g., a cryptographic token) may be stored in a location that is accessible to a headend appliance associated with the secure communication session. For instance, the token may be stored in the location based at least in part on authenticating the user 104 for access to the resource. In some examples, the token may indicate that the user 104 of the computing device 102 is authenticated for access to the resource. In other words, the token may indicate that the user 104 and/or the computing device 102 does not need to be re-authenticated again (e.g., at a later time) to access the resource.

At operation 310, the method 300 includes determining whether a networking trigger event has occurred. For example, the kernel 114 may detect an occurrence of the networking trigger event. In some examples, the networking trigger event may be any event defined in a policy that, when detected, triggers the establishment of the secure communication session. As an example, the networking trigger event may be associated with a domain name system (DNS) query for the private resource (e.g., detecting a DNS request packet). As another example, the networking trigger event may be associated with the computing device 102 attempting to establish an internet protocol (IP) session with the private resource (e.g., detecting an IP address-based connection attempt).

If, at operation 310, the networking trigger event is detected, the method 300 proceeds to operation 312. However, if the networking trigger event is not detected, the method 300 proceeds back to operation 310 to continue monitoring for a networking trigger event to occur.

At operation 312, the method 300 includes establishing the secure communication session between the computing device and a headend appliance to provide access to the resource. For example, the VPN client 108 and the VPN server 120 may establish a VPN session between the computing device 102 and the private network 106 to provide access to the application server 124. In some instances, the secure communication session may be established based at least in part on the token stored in the location accessible to the headend appliance.

At operation 314, the method 300 includes determining whether the session is inactive (e.g., whether no more network flows are flowing across the secure communication session). If the session is inactive, the method 300 proceeds to operation 316. However, if the session is still active, the method 300 proceeds back to operation 314 to continue monitoring the activity across the secure communication session. For instance, the policy may specify that no traffic flow over the session for a threshold period of time (e.g., N seconds, N minutes, N hours, etc.) before the session is considered to be inactive.

At operation 316, responsive to determining that the session is inactive, the method 300 may include causing the secure communication session to at least one of enter a standby state or disconnect. If the session is put into the standby state, then the session can be easily resumed later if the session is re-initiated. In some examples, the disconnect of the session may be triggered by networking (e.g., the computing device joins a trusted network, etc.) or posture (e.g., the user installs or uninstalls some mandatory security software, etc.) events. Additionally, in some examples, these similar events may also apply to pausing the session. Similarly, session (re)establishment may also be driven by posture events (e.g. user resolves posture compliance issues), whereas its network trigger events may also include the device joining a specific (e.g., untrusted) network.

Figure 4:
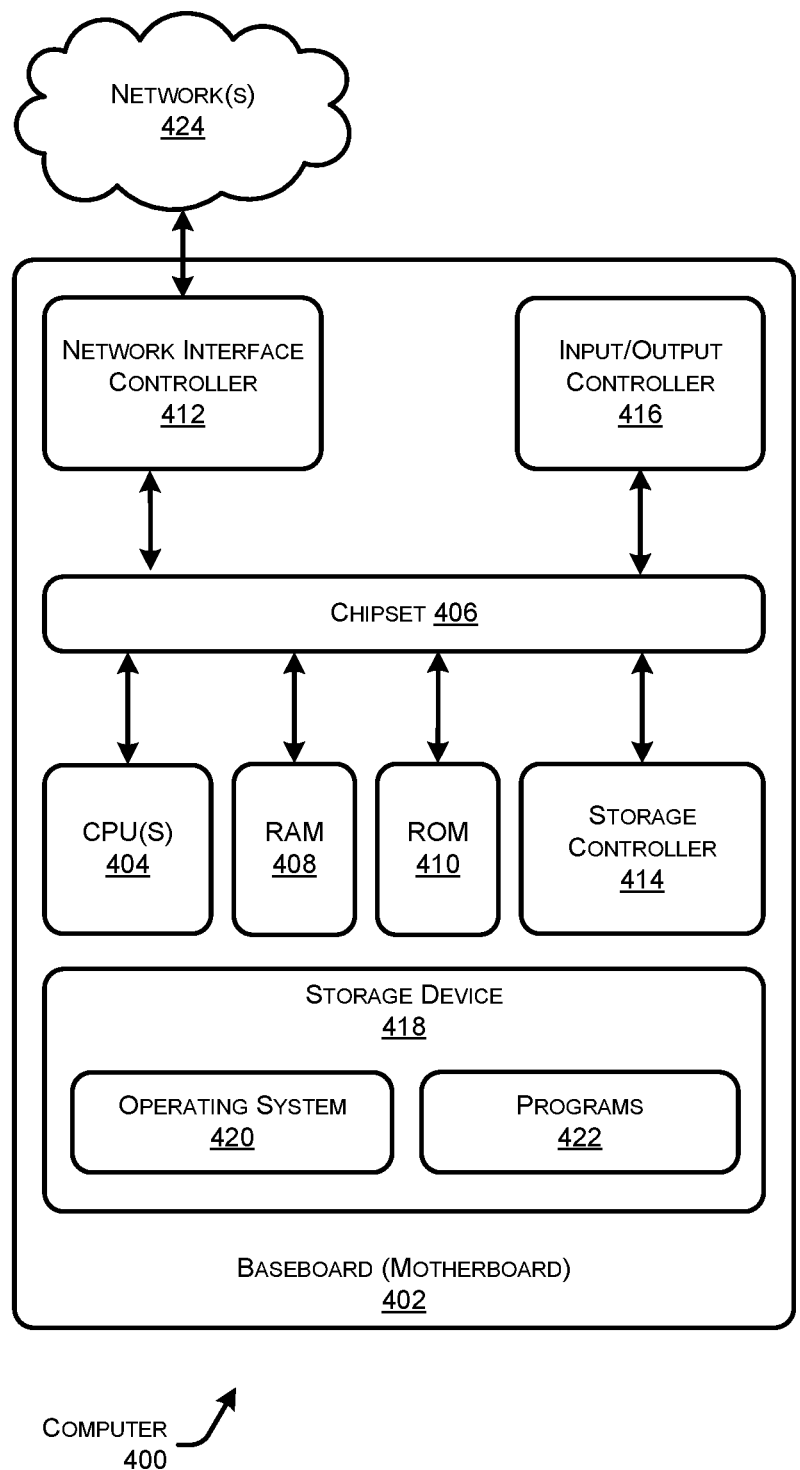
FIG. 4 is a computer architecture diagram showing an illustrative computer hardware architecture for implementing a computing device that can be utilized to implement aspects of the various technologies presented herein.

FIG. 4 is a computer architecture diagram showing an illustrative computer hardware architecture for implementing a computing device that can be utilized to implement aspects of the various technologies presented herein. The computer architecture shown in FIG. 4 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical sessions to remote computing devices and computer systems through a network. The chipset 406 can include functionality for providing network connectivity through a NIC 412, such as a gigabit Ethernet adapter. The NIC 412 is capable of connecting the computer 400 to other computing devices over the network 424. It should be appreciated that multiple NICs 412 can be present in the computer 400, connecting the computer to other types of networks and remote computer systems. In some examples, the NIC 412 may be configured to perform at least some of the techniques described herein.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by the architecture 100 and or any components included therein, may be supported by one or more devices similar to computer 400. Stated otherwise, some or all of the operations performed by the architecture 100, and or any components included therein, may be performed by one or more computer devices 400 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington.

According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes and functionality described above with regard to FIGS. 1-3, and herein. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

The computer 400 may include one or more hardware processors (processors) configured to execute one or more stored instructions. The processor(s) may comprise one or more cores. Further, the computer 400 may include one or more network interfaces configured to provide communications between the computer 400 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 422 may comprise any type of programs or processes to perform the techniques described in this disclosure for dynamically establishing, pausing, and/or terminating secure communication sessions by separating the authentication ceremony from the session establishment.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   based at least in part on detecting an occurrence of an authentication trigger event on a computing device, causing a user of the computing device to be authenticated for access to a resource, the resource to be accessed via a secure communication session;
   based at least in part on authenticating the user for access to the resource, storing, in a location that is accessible to a headend appliance associated with the secure communication session, a token indicating that the user of the computing device is authenticated for access to the resource;
   based at least in part on detecting an occurrence of a networking trigger event, establishing, based at least in part on the token, the secure communication session between the computing device and the headend appliance to provide access to the resource; and
   based at least in part on determining a lapse in a flow of traffic over the secure communication session between the computing device and the resource, causing the secure communication session to enter a standby state such that the headend appliance is less constrained for a computing resource.

2. The method of claim 1, wherein the authentication trigger event is associated with the computing device being at least one of powered on or logged into.

3. The method of claim 1, wherein the authentication trigger event is associated with the computing device joining a specific network.

4. The method of claim 1, wherein the resource is an enterprise private resource and the authentication trigger event is associated with an attempt, by the computing device, to access the enterprise private resource or another enterprise private resource.

5. The method of claim 1, wherein the secure communication session is at least one of a tunneled communication session or a proxied communication session.

6. The method of claim 1, wherein the secure communication session is a tunneled communication session associated with at least one of a virtual private network (VPN) session or a zero-trust network access (ZTNA) session.

7. The method of claim 1, wherein the resource is an enterprise private resource and the networking trigger event is associated with a domain name system (DNS) query for the enterprise private resource.

8. The method of claim 1, wherein the resource is an enterprise private resource and the networking trigger event is associated with the computing device attempting to establish an internet protocol (IP) session with the enterprise private resource.

9. The method of claim 1, further comprising: while the secure communication session is in the standby state, detecting another occurrence of the networking trigger event; and based at least in part on detecting the other occurrence of a networking trigger event, causing a transition of the secure communication session from the standby state to a connected state to allow traffic to flow over the secure communication session.

10. A system comprising: one or more processors; and one or more non-transitory computer-readable media storing instructions that, when executed, cause the one or more processors to perform operations comprising:
    storing, in a location that is accessible to a headend appliance associated with a secure communication session established between a computing device and a resource, a token indicating that a user of the computing device has been authenticated to access to the resource; based at least in part on determining a lapse in a flow of traffic over the secure communication session, causing the secure communication session to enter a standby state such that the headend appliance is less constrained for a computing resource; while the secure communication session is in the standby state, determining an occurrence of a networking trigger event; and causing a transition of the secure communication session from the standby state to a connected state to allow traffic to flow over the secure communication session between the computing device and the resource.

11. The system of claim 10, the operations further comprising causing the user of the computing device to be authenticated for access to the resource based at least in part on detecting an occurrence of an authentication trigger event on the computing device, wherein storing the token is based at least in part on the user being authenticated.

12. The system of claim 11, wherein the authentication trigger event is associated with at least one of:
the computing device being powered on;
the user logging into the computing device;
the computing device joining a specific network; or
an attempt, by the computing device, to access the resource, wherein the resource is an enterprise private resource.

13. The system of claim 10, wherein the secure communication session is at least one of a proxied communication session or a tunneled communication session, the tunneled communication session comprising at least one of a virtual private network (VPN) session or a zero-trust network access (ZTNA) session.

14. The system of claim 10, wherein the resource is an enterprise private resource and the networking trigger event is associated with at least one of:
a domain name system (DNS) query for the enterprise private resource; or
the computing device attempting to establish an internet protocol (IP) session with the enterprise private resource.

15. One or more non-transitory computer readable media storing instructions that, when executed, cause one or more processors to perform operations comprising:
detecting an occurrence of an authentication trigger event on a computing device;
based at least in part on detecting the occurrence of the authentication trigger event, causing a user of the computing device to be authenticated for access to a resource, the resource to be accessed via a secure communication session;
storing, in a location that is accessible to a headend appliance associated with the secure communication session, a token indicating that the user of the computing device has been authenticated for access to the resource;
based at least in part on detecting an occurrence of a networking trigger event, establishing, based at least in part on the token, the secure communication session between the computing device and the headend appliance to provide access to the resource;
determining a lapse in a flow of traffic over the secure communication session between the computing device and the resource; and
based at least in part on determining the lapse in the flow of traffic, causing the secure communication session to enter a standby state such that the headend appliance is less constrained for a computing resource.

16. The one or more non-transitory computer-readable media of claim 15, wherein the secure communication session is at least one of a proxied communication session or a tunneled communication session, the tunneled communication session comprising at least one of a virtual private network (VPN) session or a zero-trust network access (ZTNA) session.

17. The one or more non-transitory computer-readable media of claim 15, wherein the authentication trigger event is associated with at least one of:
the computing device being powered on;
the user logging into the computing device;
the computing device joining a specific network; or
an attempt, by the computing device, to access the resource, wherein the resource is an enterprise private resource.

18. The one or more non-transitory computer-readable media of claim 15, wherein the resource is an enterprise private resource and the networking trigger event is associated with at least one of:
a domain name system (DNS) query for the enterprise private resource; or
the computing device attempting to establish an internet protocol (IP) session with the enterprise private resource.

19. The one or more non-transitory computer-readable media of claim 15, wherein storing the token is based at least in part on the user being authenticated.

* * * * *